United States Patent
Raghunathan

(10) Patent No.: US 8,756,556 B1
(45) Date of Patent: Jun. 17, 2014

(54) METHOD FOR OPTIMIZING POWER FLOWS IN ELECTRIC POWER NETWORKS

(71) Applicant: Mitsubishi Electric Research Laboratories, Inc., Cambridge, MA (US)

(72) Inventor: Arvind U Raghunathan, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/775,589

(22) Filed: Feb. 25, 2013

(51) Int. Cl.
*G06F 17/50* (2006.01)

(52) U.S. Cl.
USPC ............ 716/133; 716/109; 716/120; 716/127

(58) Field of Classification Search
CPC ................................. G05B 13/024; H02J 3/00
USPC .................... 716/109, 120, 127, 133
See application file for complete search history.

(56) References Cited

U.S. PATENT DOCUMENTS

| | | | | |
|---|---|---|---|---|
| 6,625,520 B1 * | 9/2003 | Chen et al. | | 700/286 |
| 7,489,989 B2 * | 2/2009 | Sukhanov et al. | | 700/291 |
| 7,660,649 B1 * | 2/2010 | Hope et al. | | 700/295 |
| 7,979,255 B2 * | 7/2011 | Hanke et al. | | 703/8 |
| 8,126,685 B2 * | 2/2012 | Nasle | | 703/4 |
| 8,359,124 B2 * | 1/2013 | Zhou et al. | | 700/291 |
| 2013/0238148 A1 * | 9/2013 | Legbedji et al. | | 700/286 |

OTHER PUBLICATIONS

Almeida et al.,"Optimal Power Flow Solutions Under Variable Load Conditions", Nov. 2000, IEEE Transactions on Power Systems, vol. 15, No. 4, pp. 1204-1211.*

Moyano et al.,"Adjusted Optimal Power Flow Solutions via Parameterized Formulation" , 2010, Elsevier, Electric Power Systems Research 80, pp. 1018 -1023.*

* cited by examiner

*Primary Examiner* — Sun Lin
(74) *Attorney, Agent, or Firm* — Dirk Brinkman; Gene Vinokur

(57) ABSTRACT

Power flow in an electric power network is optimized by first decomposing an optimization problem into a set of disjoint parameterized optimization problems. The disjoint optimization problems are independent of each other, and the decomposition is based on dualized coupled constraints having corresponding multipliers. Each optimization problem is solved independently to obtain a corresponding solution, and a sensitivity of each solution to changes in the parameter. The parameters are updated using the corresponding solutions and the sensitivities, and iterated until reaching a convergence.

12 Claims, 5 Drawing Sheets

Data:
A decomposition of graph into sub-networks $(N^k, E^k)$ for $k = 1,...,Ng$.

Initialization:
Choose an initial iterate $\xi^{(0)}$ and convergence tolerance, $\varepsilon$.
Set $p = 0$. Choose $0 < \rho < 1$

Algorithm:
1. For each $k = 1,...,Ng$ do
   a. Solve the optimization problem in (8) using multipliers $\xi^{(p)}$
   b. Obtain solution $\tilde{x}^k(\xi^{(p)})$ and sensitivity $\nabla_\xi \tilde{x}^k(\xi^{(p)})$ 2. Check for convergence
   If $\phi(\xi^{(p+1)}) \leq \varepsilon$ then STOP 3. Compute the search direction $d\xi^{(p)}$ using (11)

4. Find the step length to move along $d\xi^{(p)}$
   a. Set $\alpha = 1$
   b. While (13) is not satisfied
      Set $\alpha = \rho\alpha$ 5. Update step $\xi^{(p+1)} = \xi^{(p)} + \alpha d\xi^{(p)}$
   a. Set $\xi^{(p+1)} = \xi^{(p)} + \alpha d\xi^{(p)}$
   b. Set $p = p + 1$
   c. Goto Step 1.

FIG. 4

Data:
A decomposition of graph into sub-networks $(N^k, E^k)$ for $k = 1,...,Ng$.

Initialization:
Choose an initial iterate $\xi^{(0)}$, initial smoothing parameter $\tau$ and convergence tolerance, $\varepsilon$.
Set $p = 0$. Choose $0 < \rho < 1$ and $0 < \delta$.

Procedure:
1. For each $k = 1,...,Ng$ do
   a. Solve (14) using multipliers $\xi^{(p)}$ and smoothing parameter $\tau^{(p)}$
   b. Obtain solution $\tilde{x}^k(\xi^{(p)}; \tau^{(p)})$ and sensitivity $\nabla_\xi \tilde{x}^k(\xi^{(p)}; \tau^{(p)})$. Set $p = p + 1$. Goto Step 1.

2. Check for convergence
   If $\phi(\xi^{(p)}; 0) \leq \varepsilon$ then STOP
   Elseif $\phi(\xi^{(p)}; \tau^{(p)}) \leq \delta\tau^{(p)}$ then Decrease $\tau^{(p)}$. Set $p = p + 1$. Goto Step 1.

3. Compute the search direction $d\xi^{(p)}$ using (16)

4. Find the step length to move along $d\xi^{(p)}$
   a. Set $\alpha = 1$
   b. While (18) is not satisfied
      Set $\alpha = \rho\alpha$ 5. Update step
   a. Set $\xi^{(p+1)} = \xi^{(p)} + \alpha d\xi^{(p)}$
   b. Set $p = p + 1$
   c. Goto Step 1.

FIG. 5

METHOD FOR OPTIMIZING POWER FLOWS IN ELECTRIC POWER NETWORKS

FIELD OF THE INVENTION

The present invention relates generally to electric power networks, and more particularly to optimizing the power flows in the networks.

BACKGROUND OF THE INVENTION

An electric power network includes buses connected to transmission lines. The buses are locally connected to generators and loads. Optimal power flow (OPF) analysis is often used for monitoring and controlling the operation of the network. The power flow depends, in part, on voltage magnitudes and phase angles. Power flows and voltage levels on the buses are optimized by minimizing an objective function subject to constraints, such as the magnitudes, phases, power transferred, generator capacity, thermal losses, and the like.

Most conventional OPF optimizations:
(i) Solve the problem in a centralized manner.
(ii) Do not exploit a topology of the network to distribute the optimization over the buses.

Some conventional methods for distributing the optimization problem:
(i) Use the Schur complement method, also called iterative substructuring, to distribute the computation of a single step in the optimization problem.
(ii) When the optimization problem is distributed by dual decomposition, a conventional subgradient method is used for solving the optimization problem. The subgradient method converges sub-linearly to a solution.

Thus, there remains a need to optimize power flows in electric power networks in an efficient and expedient manner by appropriately distributing the computations.

U.S. Pat. No. 6,625,520 describes a system and method for operating an electric power system that determines optimal power flow and available transfer capability of the electric power system based on the optimal power flow. The system derives data associated with an initial phase angle and maximum electric power value of a generator by determining mechanical output and electrical output of a generator, including a generator phase angle defined by a time function with a constraint condition that the generator phase angle does not exceed a preset value.

SUMMARY OF THE INVENTION

The embodiments of the invention provide methods for optimizing power flows in electric power networks using a decomposition and coordination procedure. The decomposition procedure distributes the optimization problem into a set of smaller disjoint parameterized optimization problems that are independent of each other. The coordination procedure modifies the parameter associated with the individual problems to ensure that a solution of the entire problem is attained.

The methods are based on dualizing coupled constraints to obtain the set of smaller decoupled optimization problems. In one embodiment of the method, the theory of semi-smooth equations is used in the coordination procedure. The semismooth equation theory ensures that superlinear convergence can be theoretically guaranteed in a neighborhood of the solution. Further, the theory allows for using a merit function to ensure global convergence to a solution using initial parameters that are not near the solution.

In one embodiment, the theory of smoothing based methods is used to solve the decomposed problems. A monotonic decrease of the smoothing parameter is used to ensure that superlinear convergence can be theoretically guaranteed in the neighborhood of a solution. Further, the theory allows for using a merit function to ensure global convergence to a solution even when the initial parameters are far from optimal.

BRIEF DESCRIPTION OF THE DRAWING

FIGS. 4 and 5 are pseudo code for power optimization methods according to some embodiments of the invention.

DETAILED DESCRIPTION OF THE PREFERRED EMBODIMENTS

Electrical Power Network Topology and Representative Graph

Figure 1:
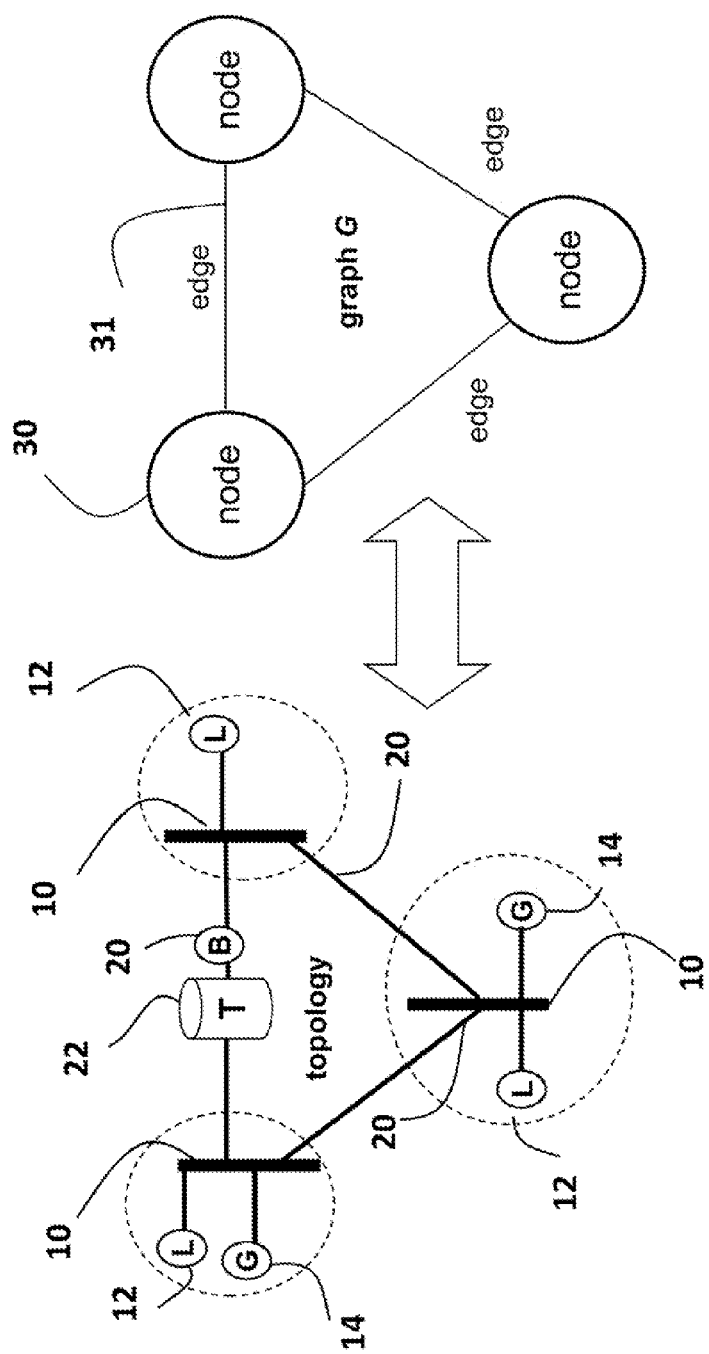
FIG. 1 is a schematic of an electric power network and a graph representing the network that can be used by embodiments of the invention.

FIG. 1 shows a topology of an electric power network that can use embodiments of the invention. The network can include AC components, and DC components connected by convertors. The only requirement is that variables and constraints that control the operation of the network are continuously controllable.

The network includes buses 10 locally connected to loads (L) 12 and generators (G) 14. The buses are interconnected by transmission lines 20, also known as branches (B). Some of the transmission lines can be connected to transformers (T) 22.

The generators supply active power (measured in, e.g., Mega Watts (MW)), and reactive power (measured in Mega Volt Ampere Reactive (MVar)). The loads consume the power. The power is defined by voltage magnitude and phase angle.

The parameters for the optimization include, but are not limited to, an admittance matrix based on the branch impedance and bus fixed shunt admittance, and the flow capacity ratings, i.e., the maximal total power flow constrained by thermal ratings.

The topology of the network can be represented by a graph G of nodes (generators and connected loads) 30 connected by edges (transmission lines) 31.

Input

Input to the method optimization includes the following:
1) A graph G(N, E) with a set of N nodes connected by a set of E edges (i, j).
2) An admittance of the lines $y_{ij}=g_{ij}+jb_{ij} \forall (i,j) \in E$, where g represents conductance of the line, b represents susceptance (imaginary part of the admittance) of the line with $j=\sqrt{-1}$.
3) Constraints on active power $p_i^{G,min}, P_i^{G,max} i \in N$ that can be produced by the generators, and the reactive power $Q_i^{G,min}, Q_i^{G,max} \forall i \in N$ that can be produced by the generators.
4) Constraints $S_{ij}^{max}, P_{ij}^{max} \forall (i,j) \in E$ on apparent and active power transferred on the lines.
5) Limits $V_i^{min}, V_i^{max} \forall i \in N$ on voltage magnitudes at the bases.
6) Constraints $L_{ij}^{max} \forall (i,j) \in E$ on thermal losses on the lines.

Output

Output of the method includes complex valued voltages $V_i, \forall i \in N$ at the buses, and active and reactive power levels $P_i^G, Q_i^G \forall i \in N$ of the generators.

The optimization uses a decision function $f(P^G, Q^G, V)$ that depends on active power generation variables $P^G = (P_1^G, \ldots, P_{|N|}^G)$, reactive power generation variables $Q^G = (Q_1^G, \ldots, Q_{|N|}^G)$, and the complex valued voltages $V = (V_1, \ldots, V_{|N|})$ at the buses.

Optimal Power Flow

The form of the decision function f is quadratic and strictly increasing:

$$f(P^G, Q^G, V) = \sum_{i \in N} \left( c_{2i}(P_i^G)^2 + c_{1i}P_i^G + c_{0i} \right),$$

where c indicates constants, with $c_{2i}, c_{1i} \geq 0 \forall i \in N$.

To model the limits of feasible operation of the network, equality constraints, inequality constraints, and bounds on the decision variables are used. The operation of the electrical network can be modeled by the equality constraints $$h_n(P^G, Q^G, V) = 0 \forall n = 1, \ldots, Ne,$$

where Ne indicates the number of equality constraints.

The constraints on the limits on power generated by generators, limits on voltage magnitudes at the buses, power transferred on the lines and thermal losses ensuring feasible operation are modeled as inequality constraints $$g_n(P^G, Q^G, V) \leq 0 \forall n = 1, \ldots, N_i,$$

where $N_i$ indicates the number of inequality constraints.

To determine the voltages at the buses and the powers produced by the generators, the following optimization problem is solved for global optimality:

minimize $f(P^G, Q^G, V)$ subject to $h_n(P^G, Q^G, V) = 0 \forall n = 1, \ldots, Ne$ $g_n(P^G, Q^G, V) \leq 0 \forall n = 1, \ldots, Ni$ (1)

where $h_n$ represents equality constraints, and $g_n$ represents equality constraints.

Optimal Power Flow-Constraints

In the preferred embodiment, the equality constraints $$h_n(P^G, Q^G, V) = 0 \forall n = 1, \ldots, Ne$$

are represented as

Power flows on the lines $$\left. \begin{array}{l} S_{ij} = V_i(y_{ij}(V_i - V_j))* \\ S_{ji} = V_j(y_{ij}(V_j - V_i))* \end{array} \right\} \forall (i,j) \in E$$

Power balances at the buses $$\sum_{j \in N(i)} S_{ij} = S_i^G - S_i^D \forall i \in N,$$

where $S_{ij} = P_{ij} + jQ_{ij}$ denotes the complex valued power transferred from bus i to bus j, $S_{ji} = P_{ji} + jQ_{ji}$ denotes the complex valued power transferred from bus j to bus i, $(V_i)^*$ denotes the complex conjugate of the complex valued variable, $S_i^G = P_i^G + jQ_i^G$ denotes the complex valued power produced by the generators and $S_i^D = P_i^D + jQ_i^D$ denotes the complex valued power demands. The variables representing power flow on the lines are used for convenience.

In the preferred embodiment, the inequality constraints $$g_n(P^G, Q^G, V) = 0 \forall n = 1, \ldots, Ni$$

are represented as

Limit on apparent power transferred on lines $$\left. \begin{array}{l} |S_{ij}| \leq S_{ij}^{max} \\ |S_{ji}| \leq S_{ij}^{max} \end{array} \right\} \forall (i,j) \in E$$

Limit on active power transferred on lines $$\left. \begin{array}{l} Re(S_{ij}) \leq P_{ij}^{max} \\ Re(S_{ji}) \leq P_{ij}^{max} \end{array} \right\} \forall (i,j) \in E$$

Limit on thermal loss on lines $$Re(S_{ij} + S_{ji}) \leq L_{ij}^{max} \forall (i,j) \in E$$

Limit of Power Generation $$P_i^{G,min} \leq P_i^G \leq P_i^{G,max}, Q_i^{G,min} \leq Q_i^G \leq Q_i^{G,max} \forall i \in N$$

Limit on Voltage Magnitude $$V_i^{min} \leq \sqrt{Re(V_i)^2 + Im(V_i)^2} \leq V_i^{max} \forall i \in N.$$

Conventional Dual Decomposition Based Optimization

Figure 2:
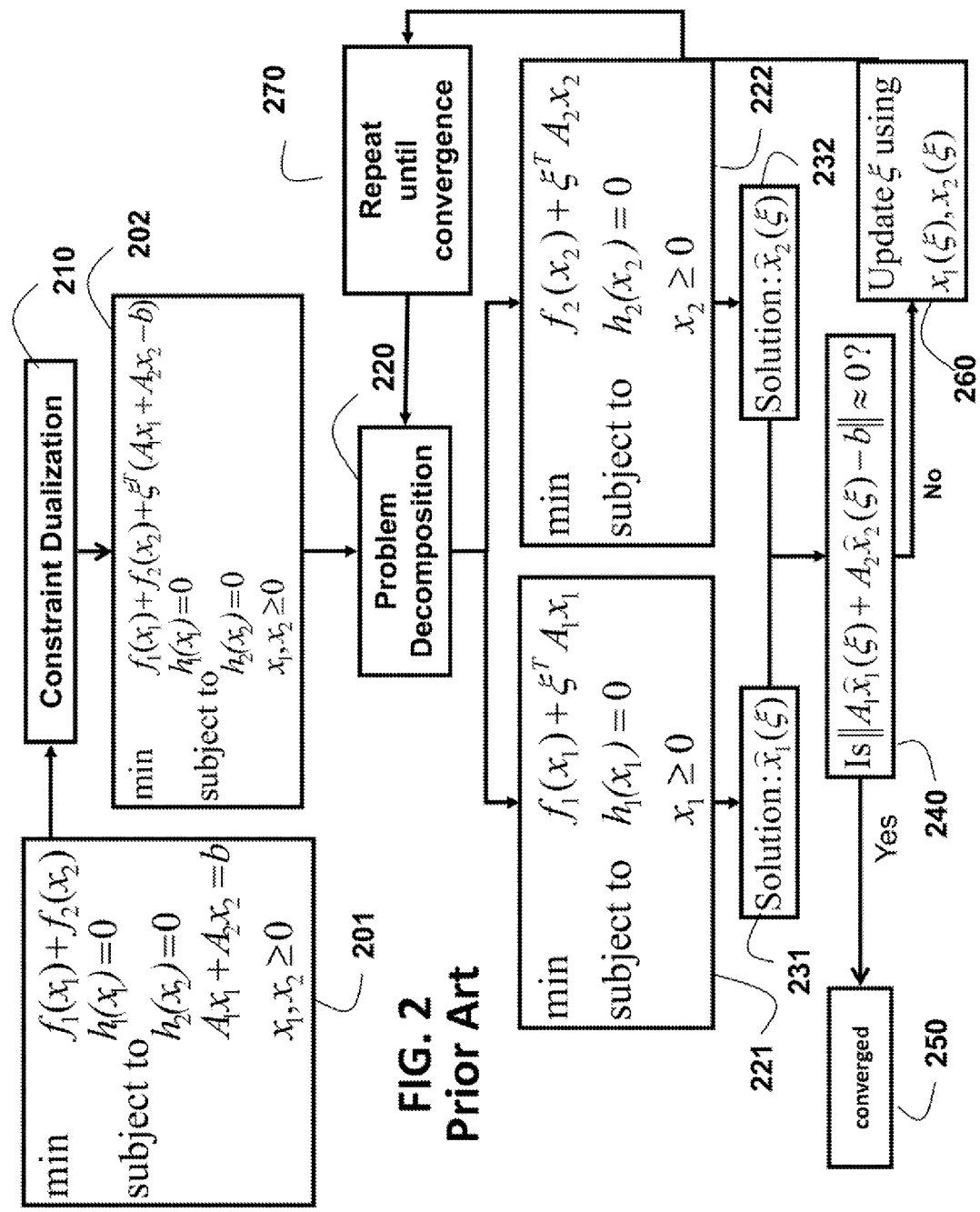
FIG. 2 is a flow chart of a conventional power optimization method.

FIG. 2 shows a conventional method for solving an optimization problem 201 as defined by equation (2) below:

min $f_1(x_1) + f_2(x_2)$ $h_1(x_1) = 0$ subject to $h_2(x_2) = 0$ $A_1 x_1 + A_2 x_2 = b$ $x_1, x_2 \geq 0.$ Observe that the optimization problem can be decomposed to separate $x_1, x_2$, but for the equality constraint $A_1 x_1 + A_2 x_2 = b$. These coupling constraints can be removed by dualizing 210 the constraints in the objective function using multipliers $\xi$ as in equation (3) below:

min $f_1(x_1) + f_2(x_2) + \xi^T(A_1 x_1 + A_2 x_2 - b)$ $h_1(x_1) = 0$ subject to $h_2(x_2) = 0$ $x_1, x_2 \geq 0.$ The optimization problem in equation (3) can be decomposed 220 to separate the variables $x_1$ 221 and $x_2$ 222 into a set of disjoint parametrized optimization problems, and corresponding constraints, and then solve the set optimization problems $x_1, x_2$, independently. In the examples used herein the set includes two disjoint problems $x_1$ and $x_2$. However, it is understood, that each problem can be further decomposed to a liner granularity as necessary.

Denote by $\hat{x}_1(\xi)$ 231 and $\hat{x}_2(\xi)$ 232 the optimal solution to each of the decomposed problems. The correct choice of multipliers $\xi$ is rarely known perfectly. As a consequence, the method iterates 270 until convergence 250 using a convergence test 240, and otherwise updating 260 the multipliers $\xi$ using only $\hat{x}_1(\xi), \hat{x}_2(\xi)$, until the constraints $A_1\hat{x}_1(\xi)+A_2\hat{x}_2(\xi)=b$ are approximately satisfied.

The updating can be performed using a line search procedure to find a local minimum. The line search finds a descent direction along which the objective function is reduced, and a step size. The descent direction can be computed by various methods, such as gradient descent, Newton's method and the quasi-Newton method.

Alternatively, a trust region can be used to optimizate a subset of the region a (quadratic) model function. If an adequate model of the objective function is found within the trust region, then the region is expanded, otherwise the region is contracted.

Fast Dual Decomposition Based Optimization

Figure 3:
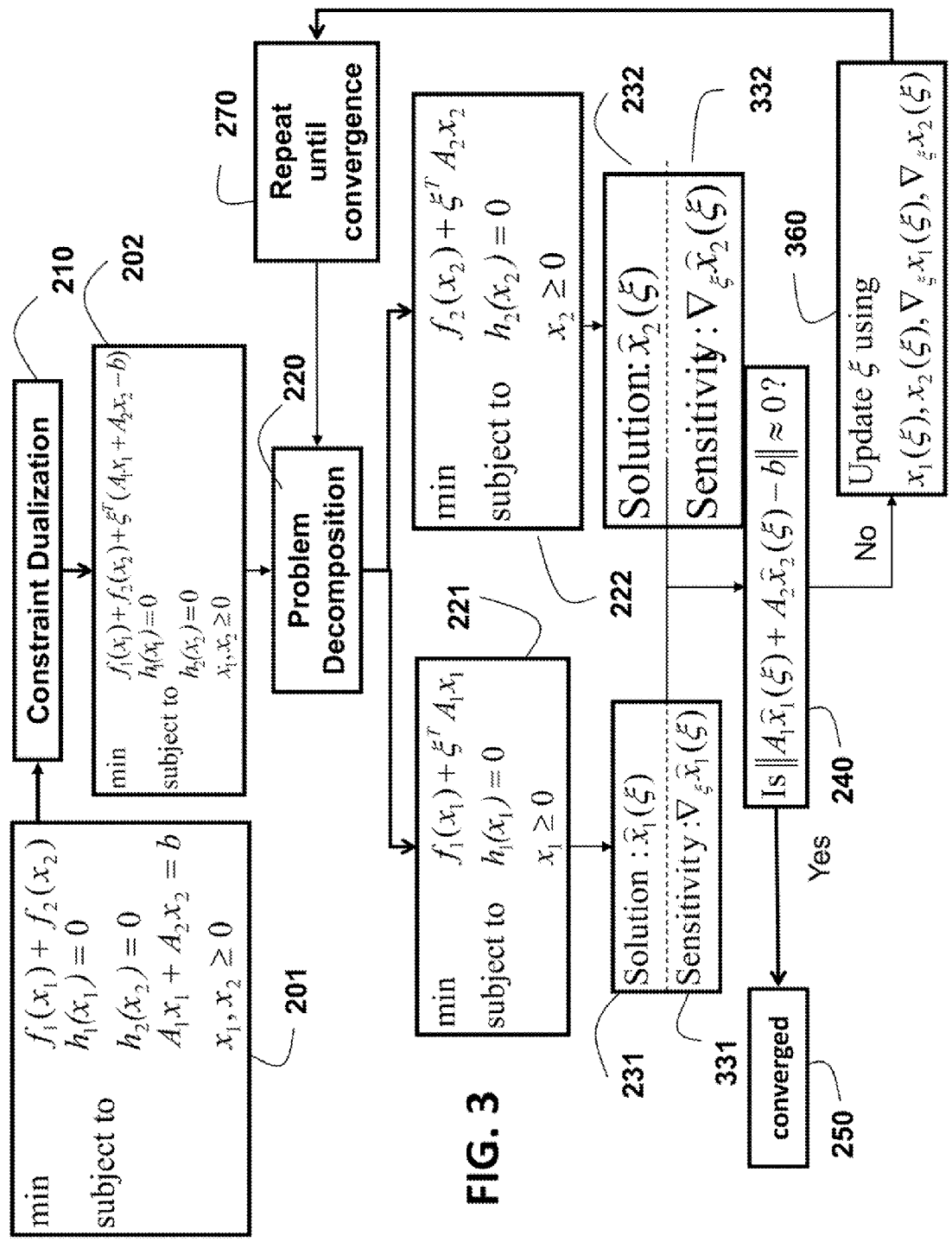
FIG. 3 is a flow chart of a power optimization method according to embodiments of the invention.

FIG. 3 shows an embodiment that accelerates the convergence of dual decomposition based methods. The initial steps are as described above for the conventional method to obtain a set of disjoint optimization problems.

The key difference is as follows. When solving each of the optimization, the invented method obtains the optimal solution $\hat{x}_1(\xi), \hat{x}_2(\xi)$ 231-232 as before, but also sensitivities of the solution to the choice of $\xi$, $\nabla_\xi \hat{x}_1(\xi), \nabla_\xi \hat{x}_2(\xi)$ 331-332.

The sensitivity measures the variation in the solutions $\hat{x}_1(\xi), \hat{x}_2(\xi)$ to changes in the multiplying parameter $\xi$.

The updating is also different, in that now the updating 360 uses

The sensitivities can be obtained by a solution of the following linear complementarity problem. In the subproblem for $x_1$ the sensitivities are obtained as:

$$\nabla_{x_1 x_1} L_1(\hat{x}_1, \hat{\lambda}_1, \hat{v}_1; \xi) \nabla_\xi \hat{x}_1(\xi) + \nabla_{x_1} h_1(\hat{x}_1) \nabla_\xi \hat{\lambda}_1 -$$
$$\nabla_\xi \hat{v}_1 = -A_1^T$$
$$h_1(\hat{x}_1) + \nabla_{x_1} h_1(\hat{x}_1)^T \nabla_\xi \hat{x}_1(\xi) = 0$$
$$\hat{x}_1(\xi) + \nabla_\xi \hat{x}_1(\xi) \geq 0 \perp \hat{v}_1(\xi) + \nabla_\xi \hat{v}_1(\xi) \geq 0. \quad (4)$$

where $\lambda$ and $v$ are respectively the multipliers corresponding to the inequality constraints and bounds, superscript T is the transpose operator and $L_1(x_1, \lambda_1, v_1; \xi)$ is a Lagrangian function defined as $$L_1(x_1, \lambda_1, v_1; \xi) = f_1(x_1) + \lambda_1^T h_1(x_1) - v_1^T x_1 + \xi^T A_1 x_1.$$

The sensitivity for $x_2$ can be obtained in a similar manner. The system in equation (4) can be reduced to a solution of linear equations when the solution satisfies: $\hat{x}_1(\xi) + \hat{v}_1(\xi) > 0$, also called a strict complementarity.

Using the sensitivity to the multiplier $\xi$, a search direction $d\xi$ can be determined using the linearization of the dualized constraints as:

$$A_1 \nabla_\xi \hat{x}_1(\xi) d\xi + A_2 \nabla_\xi \hat{x}_2(\xi) d\xi = b - A_1 \hat{x}_1(\xi) - A_2 \hat{x}_2(\xi). \quad (5)$$

This constitutes taking a Newton-like direction for the dualized constraints, and this is precisely why the convergence is accelerated. The Newton step is known to converge locally superlinearly when in the neighborhood of the solution. The conventional dual decomposition method does not have this rapid local convergence property.

Further, this approach allows one to define a merit function $$\Phi(\xi) = \|A_1 \hat{x}_1(\xi) + A_2 \hat{x}_2(\xi) - b\|_2^2,$$

to measure the progress of the method towards solving the optimization problem 201 of equation (2), where $\|\ \|_2$ represent the Euclidean vector norm.

The merit function influences the choice of the next multipliers through the sufficient decrease requirement where the step length $\alpha \in (0,1]$ is selected to satisfy:

$$\Phi(\xi + \alpha d\xi) \leq \Phi(\xi) + \beta \alpha \Phi'(\xi; d\xi), \quad (6)$$

where $\beta > 0$ is usually a small constant, and $\Phi'(\xi; d\xi)$ is the directional derivative of the merit function at the point $\xi$ along the direction $d\xi$. The directional derivative is mathematically defined by the following limit:

$$\phi'(\xi; d\xi) = \lim_{t \to 0} \frac{\phi(\xi + td\xi) - \phi(\xi)}{t}.$$

Fast Dual Decomposition Based Optimization for Optimal Power Flow

Consider a partition of the edges in the network into Ng smaller set of edges ($E^1, E^2, \ldots, E^{Ng}$) where the sets are disjoint and their union is the set of all edges E. The set of buses in edge set $E^k$ is denoted by $N^k$. Utilizing this set of smaller networks $G(N^k, E^k)$ the optimal power flow problem can be equivalently formulated as described in the following. Further, denote by $K_i$ the set of networks to which the node i belongs.

The objective function for each sub-network can be posed as:

$$f(P^{G,k}, Q^{G,k}, V^k) = \sum_{i \in N^k} \left( c_{2i}^k (P_i^{G,k})^2 + c_{1i}^k P_i^{G,k} + c_{0i}^k \right),$$

where $P_i^{G,k}, Q_i^{G,k}, V_i^k$ denotes the real power, reactive power and voltage at the node i in node set $N^k$. The constants are selected as:

$$c_{2i}^k = \frac{c_{2i}}{n_i}, c_{1i}^k = \frac{c_{1i}}{n_i}, c_{0i}^k = \frac{c_{0i}}{n_i},$$

where $n_i$ is the number of sub-networks k in which the node i occurs.

The constraints modeling the operation of the electrical network by the equality constraints:

$$h_n^k(P^{G,k}, Q^{G,k}, V^k) = 0 \forall n = 1, \ldots, Ne^k, k = 1, \ldots, Ng$$

where $Ne^k$ indicates the number of equality constraints in the sub-network k.

We model the limits on power generated by generators, limits on voltage magnitudes at the buses, constraints on the power transferred on the lines and thermal losses ensuring feasible operation as inequality constraints $$g_n^k(P^{G,k}, Q^{G,k}, V^k) \leq 0 \forall n = 1, \ldots, Ni^k, k = 1, \ldots, Ng,$$

where $Ni^k$ indicates the number of inequality constraints in the sub-network k.

Constraints are also imposed on power generation and voltage magnitudes at the buses.

To determine the voltages at the buses and the powers produced by the generators, the following optimization problem is solved to global optimality:

$$\text{minimize} \sum_{k=1}^{Ng} f^k(P^{G,k}, Q^{G,k}, V^k) \quad (7)$$

$$\text{subject to } h_n^k(P^{G,k}, Q^{G,k}, V^k) = 0 \forall n = 1, \ldots, Ne^k, k = 1, \ldots, Ng$$

$$g_n^k(P^{G,k}, Q^{G,k}, V^k) \leq 0 \forall n = 1, \ldots, Ni^k, k = 1, \ldots, Ng$$

-continued $$\left.\begin{array}{l}P_i^{G,k} = P_i^{G,l} \\ Q_i^{G,k} = Q_i^{G,l} \\ \operatorname{Re}(V_i^k) = \operatorname{Re}(V_i^l) \\ \operatorname{Im}(V_i^k) = \operatorname{Im}(V_i^l)\end{array}\right\} k = \min(K_i), l \in N_i, k \neq l, i \in N,$$

where the last set of constraints equates the generator power and voltages for nodes that are shared by different sub-networks k. The above formulation is identically equivalent to the optimal power flow formulation.

For ease of exposition, the notation $x^k = (P^{G,k}, Q^{G,k}, V^k)$ is used in the following and $x_i^k = (P_i^{G,k}, Q_i^{G,k}, V_i^{G,k})$ for some $i \in N^k$. With this notation, the problem in equation (2) can be reformulated as:

$$\text{minimize} \quad \sum_{k=1}^{Ng} f^k(x^k)$$

$$\text{subject to} \quad h_n^k(x^k) = 0 \,\forall\, n = 1, \ldots, Ne^k, k = 1, \ldots, Ng$$

$$g_n^k(x^k) \leq 0 \,\forall\, n = 1, \ldots, Ni^k, k = 1, \ldots, Ng$$

$$x_i^k = x_i^l; k = \min(K_i), l \in N_i, k \neq l, i \in N.$$

The above problem equation is decomposed into smaller optimization problems by removing the set of the equality constraints in the optimization and replacing it in the objective function as:

$$\text{minimize} \quad \sum_{k=1}^{Ng} f^k(x^k) + \sum_{i \in N} \left( \sum_{k=\min(N_i), k \neq l} (\xi_i^{kl})^T (x_i^k - x_i^l) \right)$$

$$\text{subject to} \quad h_n^k(x^k) = 0 \,\forall\, n = 1, \ldots, Ne^k, k = 1, \ldots, Ng$$

$$g_n^k(x^k) \leq 0 \,\forall\, n = 1, \ldots, Ni^k, k = 1, \ldots, Ng,$$

where, $\xi_i^{kl}, k = \min(K_i), k \neq l$ are the multipliers for equality constraints that equate the copies of the power generation and voltage variables for nodes that are shared across sub-networks. This procedure is called the dualization of the coupling constraints. This renders the optimization problem decoupled by sub-networks.

The optimization for each sub-network is:

$$\text{minimize} \quad \sum_{k=1}^{Ng} \tilde{f}^k(x^k; \xi) \quad (8)$$

$$\text{subject to} \quad h_n^k(x^k) = 0 \,\forall\, n = 1, \ldots, Ne^k$$

$$g_n^k(x^k) \leq 0 \,\forall\, n = 1, \ldots, Ni^k, k = 1,$$

where the objective function for $k = \min(K_i)$ is:

$$\tilde{f}^k(x^k; \xi) = f^k(x^k) + \sum_{i \in N} \sum_{l \neq \min(K_i)} (\xi_i^{kl})^T x_i^k$$

and for $l \neq \min(K_i)$ is:

$$\tilde{f}^l(x^l; \xi) = f^l(x^l) + \sum_{i \in N} (\xi_i^{kl})^T x_i^l$$

The decomposition step solves each of the optimization problems for the sub-networks $k = 1, \ldots, Ng$ for a given choice of the multipliers $\xi$. Denote by $\hat{x}^k(\xi)$ the optimal solution to the problem corresponding to the subnetwork k. Further, denote by $\nabla_\xi \hat{x}^k(\xi)$ the sensitivity of the optimal solution to the sub-network k for the given choice of multipliers. The sensitivity can be obtained as follows. The first order optimality conditions for the sub-network k is:

$$\nabla_{x^k} L^k(x^k, \lambda^{j,k}, \lambda^{g,k}; \xi) = 0$$

$$h_n^k(x^k) = 0 \,\forall\, n = 1, \ldots, Ne^k$$

$$g_n^k(x^k) \perp 0 \perp \lambda_n^{g,k} \geq 0 \,\forall\, n = 1, \ldots, Ni^k, \quad (9)$$

where the Lagrangian function is defined as:

$$L^k(x^k, \lambda^{h,k}, \lambda^{g,k}; \xi) = \tilde{f}^k(x^k; \xi) + \sum_{n=1}^{Ne^k} \lambda_n^{h,k} h_n^k(x^k) + \sum_{n=1}^{Ni^k} \lambda_n^{g,k} g_n^k(x^k)$$

where the notation $\lambda_n^{h,k}$ represent the multipliers for the equality constraints $h_n^k$; $\lambda_n^{g,k}$ represent the multipliers for the inequality constraints $g_n^k$.

A solution $\hat{x}^k(\xi)$ to the optimal solution to the problem corresponding to the sub-network k. will necessarily satisfy the first order optimality conditions listed above. The Sensitivity of the optimal solution to the multipliers $\xi$ can be obtained by solving the following linear complementarity problem obtained by differentiating the first order conditions with respect to variables $x^k$ and multipliers $(\lambda^{h,k}, \lambda^{g,k})$:

$$\nabla_{x^k x^k} L^k(\hat{x}^k, \hat{\lambda}^{h,k}, \hat{\lambda}^{g,k}; \xi) \nabla_\xi \hat{x}^k + \sum_{n=1}^{Ne^k} \nabla_{x^k} h_n^k(\hat{x}^k) \nabla_\xi \hat{\lambda}_n^{h,k} + \quad (10)$$

$$\sum_{n=1}^{Ni^k} \nabla_{x^k} g_n^k(\hat{x}^k) \nabla_\xi \hat{\lambda}^{g,k} = -\nabla_{x^k \xi} \tilde{f}^k(\hat{x}^k; \xi)$$

$$\nabla_{x^k} h_n^k(\hat{x}^k)^T \nabla_\xi \hat{\lambda}_n^{g,k} = 0 \,\forall\, n = 1, \ldots, Ne^k$$

$$g_n^k(\hat{x}^k) + \nabla_{x^k} g_n^k(\hat{x}^k)^T \nabla_\xi \hat{x}^k \leq 0 \perp \hat{\lambda}_n^{g,k} + \nabla_\xi \hat{\lambda}^{g,k} \geq 0 \,\forall\, n = 1,$$

$$\ldots, Ni^k.$$

The sensitivity computations are used to compute a search direction $d\xi$ for the multipliers by solving the following equations:

$$\hat{x}_i^k(\xi) + \nabla_\xi \hat{x}_i^k(\xi)^T d\xi = \hat{x}_i^l(\xi) + \nabla_\xi \hat{x}_i^l(\xi)^T d\xi; k = \min$$
$$(K_i), l \in N_i, k \neq l, i \in N. \quad (11)$$

Using this search direction a new set of multipliers $\xi^+ = \xi + \alpha d\xi$ where $0 < \alpha \leq 1$ is selected as described below. Define the function $\Phi(\xi)$ termed the merit function as $$\phi(\xi) := \left\| \begin{bmatrix} \hat{x}_i^k(\xi) - \hat{x}_i^l(\xi); k = \min(K_i), l \in N_i, k \neq l, i = 1 \\ \ldots \\ \hat{x}_i^k(\xi) - \hat{x}_i^l(\xi); k = \min(K_i), l \in N_i, k \neq l, i = |N| \end{bmatrix} \right\|_2^2. \quad (12)$$

The merit function is the Euclidean norm of the residual of the dualized constraints that couple the different sub-networks. This measures the degree to which the original problem in equation (1) has been solved. When $\Phi(\xi) \approx 0$, the method terminates with $\hat{x}^k(\xi)$ as the solution for equation (1).

The step for multipliers is selected so that the merit function is decreased as prescribed the following condition:

$$\Phi(\xi + \alpha d\xi) \leq \Phi(\xi) + \beta\alpha\Phi'(\xi; d\xi) \quad (13)$$

where $\Phi'(\xi; d\xi)$ is the directional derivative of the merit function at the point $\xi$ along the direction $d\xi$ and is mathematically defined by the following limit:

$$\phi'(\xi; d\xi) = \lim_{t \to 0} \frac{\phi(\xi + td\xi) - \phi(\xi)}{t}.$$

Using the new multiplier $\xi^+$, the decomposed optimization in equation (3), sensitivity computation (4) and multiplier step computation (5) are repeated until the merit function $\Phi(\xi)$ is close to zero.

A description of the methodic steps is provided in FIG. 4.

Fast Dual Decomposition with Smoothing for Optimal Power Flow

The fast decomposition approach is based on the computation of sensitivities with respect to the multipliers $\xi$ for the dualized constraints. However, the sensitivity may not exist under some conditions. For instance in optimization problem (3) when $\hat{x}_1(\xi) + \hat{v}_i(\xi) \not> 0$ does not hold. In such instances only a directional derivative can be obtained.

To rectify this situation consider the modification of the problem solved for each of the sub-networks k as follows. Consider modifying the stationary conditions (9) as, $$\nabla_{x^k} L^k(x^k, \lambda^{h,k}, \lambda^{g,k}; \xi) = 0$$

$$h_n^k(x^k) = 0 \forall n = 1, \ldots, Ne^k$$

$$\psi(-g_n^k(x^k), \lambda_n^{g,k}; \tau) = 0 \forall n = 1, \ldots, Ni^k, \quad (14)$$

where the function $\psi(a,b;\tau)$ is a smoothing function for the complementarity constraints satisfying the property that:
(i) $\psi(a,b;0) = 0 \Leftrightarrow a \geq 0 \perp b \geq 0$
(ii) $\psi(a,b;\tau)$ is continuously differentiable for all $\tau > 0$.

The second property ensures that the for all $\tau > 0$ the optimization problems are smooth and continuously differentiable. While the first property ensures that one can recover a solution to equation (9) by solving a sequence smoothed problem when $\tau \to 0$. There exist several choices for such a function:
1. $\psi(a,b;\tau) = a + b - \sqrt{a^2 + b^2 + \tau^2}$
2. $\psi(a,b;\tau) = a + b - \sqrt{(a-b)^2 + \tau^2}$
3. $\psi(a,b;\tau) = ab - \tau, a, b \geq 0$ In the third choice the nonnegativity of a and b have to enforced explicitly. This is precisely what interior point methods do.

Using this modification the method where solution to original problem (1) is obtained can be restated by first solving for fixed $\tau > 0$ the problem in equation (14) to a certain tolerance and then decreasing $\tau \to 0$ to obtain a solution to equation (1) in the limit.

Denote by $(\hat{x}^k, \hat{\lambda}^{h,k}, \hat{\lambda}^{g,k})(\xi;\tau)$ the solutions to equation (14). In the case of smoothing, the sensitivity of solutions to the multipliers $\xi$ can be computed as the solution of the following linear equations:

$$\nabla_{x^k x^k} L^k(\hat{x}^k, \hat{\lambda}^{h,k}, \hat{\lambda}^{g,k}; \xi)\nabla_\xi \hat{x}^k + \sum_{n=1}^{Ne^k} \nabla_{x^k} h_n^k(\hat{x}^k)\nabla_\xi \hat{\lambda}_n^{h,k} + \quad (15)$$

$$\sum_{n=1}^{Ni^k} \nabla_{x^k} g_n^k(\hat{x}^k)\nabla_\xi \hat{\lambda}^{g,k} = -\nabla_{x^k} \hat{f}^k(\hat{x}^k; \xi)$$

$$\nabla_{x^k} h_n^k(\hat{x}^k)^T \nabla_\xi \hat{x}^k = 0 \forall n = 1, \ldots, Ne^k$$

$$\psi(-g_n^k(\hat{x}^k), \hat{\lambda}_n^{g,k}; \tau) + \nabla_{x^k} \psi(-g_n^k(\hat{x}^k), \hat{\lambda}_n^{g,k}; \tau)^T \nabla_\xi \hat{x}^k +$$

$$\nabla_{\lambda^{g,k}} \psi(-g_n^k(\hat{x}^k), \hat{\lambda}_n^{g,k}; \tau)\nabla_\xi \hat{\lambda}_n^{g,k} = 0 \forall n = 1, \ldots, Ni^k,$$

Observe these are linear equations as opposed to linear complementarity equations as in equation (10).

The sensitivity computations are used to compute a search direction $d\xi$ for the multipliers by solving the following equations:

$$\hat{x}_i^k(\xi,\tau) + \nabla_\xi \hat{x}_i^k(\xi,\tau)^T d\xi = \hat{x}_i^l(\xi,\tau) + \nabla_\xi \hat{x}_i^l(\xi,\tau)^T d\xi \, k = \min \quad (16)$$
$$(K_i), l \in N_i, k \neq l, i \in N$$

Using this search direction a new set of multipliers $\xi^+ = \xi + \alpha d\xi$ where $0 < \alpha \leq 1$ is selected as described below. Define the function $\Phi(\xi)$ termed the merit function as $$\phi(\xi; \tau) := \left\| \begin{bmatrix} \hat{x}_i^k(\xi; \tau) - \hat{x}_i^l(\xi; \tau); k = \min(K_i), l \in N_i, k \neq l, i = 1 \\ \ldots \\ \hat{x}_i^k(\xi; \tau) - \hat{x}_i^l(\xi; \tau); k = \min(K_i), l \in N_i, k \neq l, i = |N| \end{bmatrix} \right\|_2^2. \quad (17)$$

The merit function is the Euclidean norm of the residual of the dualized constraints that couple the different sub-networks. This measures the degree to which the original problem (1) has been solved. When $\Phi(\xi;\tau) \approx \tau$, the iterations for particular smoothing parameter value and decrease the parameter can be terminated. When $\Phi(\xi;0) \approx 0$, terminate the method terminates with $\hat{x}^k(\xi)$ as the solution for equation (1).

The step for multipliers is selected so that the merit function decreases as prescribed the following condition:

$$\Phi(\xi + \alpha d\xi; \tau) \leq \Phi(\xi; \tau) + \beta\alpha\nabla_\xi \Phi(\xi; \tau)^T d\xi, \quad (18)$$

where $\nabla_\xi \Phi(\xi;\tau)$ is the gradient of the merit function at the given point $\xi$. A full derivative can be defined, instead of a directional derivative as in equation (13). If the smoothing parameter is selected to be decreased superlinearly, then fast local convergence in the neighborhood of the solution to equation can be obtained (1).

FIGS. 4 and 5 show the pseudo code for the above embodiments. The steps of the method can be performed in one or more processors connected to memory and input/output interfaces as known in the art.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for optimizing a power flow in an electric power network by solving an optimization problem, comprising steps of:
    decomposing the optimization problem into a set of disjoint parameterized optimization problems, wherein the disjoint parameterized optimization problems in the set are independent of each other, and wherein the decomposition is based on constraints having corresponding multipliers, which are parameters of the disjoint parameterized optimization problems, and wherein the constraints are dualized coupled constraints;
    solving each disjoint parameterized optimization problem independently to obtain a corresponding solution, and a sensitivity of each solution to changes in the parameter associated with said each disjoint parameterized optimization problem;
    updating the parameters using the corresponding solutions and the sensitivities; and
    repeating the decomposing, the solving, and the updating until reaching a convergence, wherein the steps are performed in a processor.

2. The method of claim 1, wherein variables of the constraints are continuously controllable.

3. The method of claim 1, further comprising:
    representing the electric power network by a graph of nodes and edges, wherein the nodes represent generators and loads connected buses, and the edges (i, j) between the nodes represent transmission lines.

4. The method of claim 1, wherein an input to the method includes:
    the graph,
    transmission lines (ij),
    an admittance of the transmission lines (ij)

$$y_{ij}=g_{ij}+jb_{ij},$$

where $g_{ij}$ represents a conductance of the transmission line (ij), b(ij) represents a susceptance of the transmission line, and $j=\sqrt{-1}$,
    constraints on active power $P_i^{G,min}, P_i^{G,max}$ that can be produced by the generators, and the reactive power $Q_i^{G,min}, Q_i^{G,max}$ that can be produced by the generators.
    constraints $S_{ij}^{max}, P_{ij}^{max}$ on apparent and active power transferred on the transmission transmission lines,
    limits $V_i^{min}, V_i^{max}$ on voltage magnitudes at the buses,
    constraints $L_{ij}^{max}$ on thermal losses on the transmission lines; and outputs of the method include:
    complex valued voltages $V_i$ at the buses, and active and reactive power levels $P_i^G, Q_i^G$ of the generators.

5. The method of claim 4, wherein the optimization uses a decision function $f(P^G, Q^G, V)$ that depends on active power generation variables $P^G=(P_1^G, \ldots, P_{|N|}^G)$, reactive power generation variables $Q^G=(Q_1^G, \ldots, Q_{|N|}^G)$, and complex valued voltages $V=(V_1, \ldots, V_{|N|})$ at the buses.

6. The method of claim 5, wherein the decision function f is quadratic and strictly increasing:

$$f(P^G, Q^G, V) = \sum_{i \in N} \left( c_{2i}(P_i^G)^2 + c_{1i}P_i^G + c_{0i} \right),$$

where c indicates constants, with $c_{2i}, c_{1i} \geq 0 \forall i \in N$.

7. The method of claim 1, wherein limits of feasible operation of the electric power network, equality constraints, inequality constraints, and bounds on decision variables are used.

8. The method of claim 1, wherein inequality constraints are represented as a smoothed equality constraints using a smoothing parameter, and the smoothing parameter is reduced to zero during the repeating of the updating.

9. The method of claim 1, wherein the updating of the parameters are performed using a line search procedure.

10. The method of claim 1, wherein the updating of the parameters are performed using a trust region.

11. The method of claim 1, wherein the updating alternates between updating with and without using the sensitivities.

12. The method of claim 1, wherein the sensitivities measures a variation in the solutions to changes in the multipliers.

* * * * *